United States Patent [19]

Shimura

[11] Patent Number: 4,941,194
[45] Date of Patent: Jul. 10, 1990

[54] METHOD OF COMPRESSING RADIATION IMAGE SIGNAL

[75] Inventor: Kazuo Shimura, Kanagawa, Japan

[73] Assignee: Fuji Photo Film Co., Ltd., Kanagawa, Japan

[21] Appl. No.: 235,767

[22] Filed: Aug. 24, 1988

Related U.S. Application Data

[63] Continuation of Ser. No. 12,716, Feb. 5, 1987, abandoned.

[30] Foreign Application Priority Data

Feb. 5, 1986 [JP]  Japan .................................. 61-23475

[51] Int. Cl.$^5$ .............................................. G06K 9/36
[52] U.S. Cl. ........................................... 382/56; 382/6
[58] Field of Search ................. 364/413.23; 378/2, 99, 378/901; 358/133, 135, 111, 260, 263, 282, 287, 261.1, 261.4; 382/6, 34, 41, 47-52, 56

[56] References Cited

U.S. PATENT DOCUMENTS

| | | | |
|---|---|---|---|
| 4,155,097 | 5/1979 | Lux | 358/135 |
| 4,168,513 | 9/1979 | Hains et al. | 358/135 |
| 4,356,555 | 10/1982 | Ejiri et al. | 382/50 |
| 4,369,463 | 1/1983 | Anastassiou et al. | 382/56 |
| 4,554,593 | 11/1985 | Fox et al. | 358/282 |
| 4,602,333 | 7/1986 | Komori | 382/56 |
| 4,616,319 | 10/1986 | Peters et al. | 378/901 |
| 4,667,251 | 5/1987 | Hasegawa | 358/283 |
| 4,668,995 | 5/1987 | Chen et al. | 358/284 |
| 4,688,175 | 8/1987 | Kaneko et al. | 378/99 |

Primary Examiner—Leo H. Boudreau
Assistant Examiner—Jose L. Couso
Attorney, Agent, or Firm—Sughrue, Mion, Zinn, Macpeak & Seas

[57] ABSTRACT

A method of compressing radiation image signals by conducting redundancy suppression encoding processing of original image signals representing a radiation image comprises the steps of conducting pre-processing for decreasing the number of image signals of the original image signals by an appropriate method, and subjecting the image signals obtained by the pre-processing to the redundancy suppression encoding processing.

6 Claims, 3 Drawing Sheets

FIG. 4

| $a_{11}$ | $\Delta a_{12}$ $=a_{12}-a_{11}$ | $\Delta a_{13}$ $=a_{13}-a_{12}$ | $\Delta a_{14}$ $=a_{14}-a_{13}$ |
|---|---|---|---|
| $a_{21}$ | $\Delta a_{22}$ $=a_{22}-a_{21}$ | $\Delta a_{23}$ $=a_{23}-a_{22}$ | $\Delta a_{24}$ $=a_{24}-a_{23}$ |
| $a_{31}$ | $\Delta a_{32}$ $=a_{32}-a_{31}$ | $\Delta a_{33}$ $=a_{33}-a_{32}$ | $\Delta a_{34}$ $=a_{34}-a_{33}$ |

FIG. 5

| TOI | $a_{11}'$ | $\Delta a_{12}'$ | $\Delta a_{13}'$ | ------- | $\Delta a_{1n}'$ | TOL | $a_{21}'$ |

| $\Delta a_{2n}'$ | TOL | $a_{31}'$ | $\Delta a_{32}'$ | ------- |

FIG. 6A

| | $X_{11}$ | $X_{12}$ | | |
|---|---|---|---|---|
| $L_1$ | A | B | E | F |
| | C | D | G | H |
| $L_2$ | I | J | M | N |
| | K | L | O | P |

| | $X_{11}$ | $X_{12}$ | | |
|---|---|---|---|---|
| | A' | B' | E' | F' |
| | C' | D' | G' | H' |
| | I' | J' | M' | N' |
| | K' | L' | O' | P' |

$X_{21}$  $X_{22}$

METHOD OF COMPRESSING RADIATION IMAGE SIGNAL

This is a continuation of application Ser. No. 07/012,716 filed Feb. 5, 1987, now abandoned.

BACKGROUND OF THE INVENTION

1. Field of the Invention

This invention relates to a method of compressing radiation signals by conducting redundancy suppression encoding processing such as prediction encoding processing of the radiation image signals.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by suppressing the redundancy. Also, in recent years, recording of half tone images on optical disks, magnetic disks, or the like has been put into general practice. In this case, image signal compression is conducted generally for the purpose of efficiently recording image signals on a recording medium.

In a radiation image recording and reproducing system wherein a stimulable phosphor sheet is used as disclosed in, for example, U.S. Pat. No. 4,258,264 and Japanese Unexamined Patent Publication No. 56(1981)-11395, a radiation image of an object such as the human body stored on the stimulable phosphor sheet is read out to obtain digital image signals, which are then subjected to appropriate image processing and used for reproducing the radiation image as a visible image on a cathode ray tube (CRT) or the like. After the visible image is reproduced, the processed digital image signals may be stored on a recording medium such as an optical disk, and read out of the recording medium when necessary for reproducing the visible image.

However, since the aforesaid radiation image is generally a half tone image, the amount of digital image signals representing the radiation image is very large. Therefore, in a large-scale hospital or the like where, for example, hundreds or thousands of radiation images are to be recorded annually, the amount of image signals which should be stored becomes enormous in the case where all of the image signals representing the recorded radiation images are to be stored. A large space is required for storing the image signals and the cost of storing the image signals becomes very high. Accordingly, a need exists for a technique of compressing the image signals as efficiently as possible before storing the image signals. This applied also to the case of transmission of the radiation image signals.

The need for compressing the image signals with a high efficiency when storing or transmitting the digital image signals exists not only in the case of the radiation images recorded by use of the aforesaid radiation image recording and reproducing system but also in the cases of radiation images recorded by various other methods.

On the other hand, there has heretofore been known a technique wherein redundancy of the digital image signals is suppressed by redundancy suppression encoding processing such as prediction encoding, thereby compressing the amount of the image signals, and thereafter the compressed image signals are stored or transmitted.

Accordingly, the signal compression technique may be utilized in the course of storing or transmitting the digital image signals representing a radiation image. In this case, the compressibility should be as high as possible. Therefore, it is desired that the signal compression technique be utilized to obtain as high a compressibility as is practicable for maintaining the necessary image quality of a reproduced visible image.

SUMMARY OF THE INVENTION

The primary object of the present invention is to provide a method of compressing radiation image signals, which utilizes characteristics of the objective radiation image and thereby achieves a signal compression ratio higher than when the conventional signal compression technique is applied directly.

Another object of the present invention is to provide a method of compressing radiation image signals, which achieves a high signal compression ratio while maintaining the necessary image quality in the course of image reproduction.

The present invention provides a method of compressing radiation image signals by conducting redundancy suppression encoding processing on original image signals representing a radiation image, wherein the improvement comprises the steps of: conducting pre-processing for decreasing the number of image signals of said original image signals by an appropriate method, and subjecting the image signals obtained by said pre-processing to said redundancy suppression encoding processing.

In short, the pre-processing for decreasing the number of image signals is equivalent to processing for decreasing the spatial resolution. For example, with the pre-processing, the original image signals are alternately sampled to decrease the number of the image signals to one half. Or, the number of the image signals is decreased to one fourth by dividing the image into blocks each of which is composed of $2\times 2$ picture elements, and sampling only the representative image signals of the blocks calculated by averaging the image signals of the four picture elements in the respective blocks.

In general, in order to compress and decrease the amount of signals which are to be recorded or transmitted, a method of compressing the amount of signals by the aforesaid redundancy suppression encoding processing may be used.

However, it is technically not always possible to markedly improve the compression ratio by the redundancy suppression encoding processing. On the other hand, the method of decreasing the spatial resolution or the density resolution is technically easy to accomplish and, since the amount of signals is decreased directly, the method markedly contributes to improvement of the ultimate signal compression ratio. However, the method generally has the drawback that it causes the image quality to deteriorate.

However, experiments conducted by the inventors revealed that the radiation image, particularly the radiation image of the human body or the like, has the characteristics that the image portion important for viewing, particularly for diagnostic purposes, is present in the low spatial frequency region, and therefore the image quality, particularly diagnostic efficiency and accuracy, does not deteriorate even though the spatial resolution is decreased and high spatial frequency components are eliminated.

In short, the present invention is based on the characteristics of the radiation image as mentioned above that, unlike the other ordinary images, the important image portion, i.e. the image portion comparatively useful for viewing, particularly for diagnostic purposes, does not have so many high spatial frequency components. In the method of compressing radiation image signals of the present invention, the number of the image signals is decreased prior to the aforesaid redundancy suppression encoding processing, the redundancy suppression encoding processing is conducted on the decreased number of the image signals, and the image signals thus processed are stored, thereby ultimately achieving a high signal compression ratio and avoiding deterioration of the image quality.

With the method of compressing radiation image signals in accordance with the present invention, since the number of image signals is decreased, i.e. the spatial resolution is decreased, prior to the redundancy suppression encoding processing, and the redundancy suppression encoding processing is conducted only of the image signals thus decreased, it is possible to ultimately achieve a signal compression ratio higher than when the redundancy suppression encoding processing is conducted without conducting the signal number decreasing pre-processing.

Also, the radiation image of the human body or the like has the characteristics that, unlike the other ordinary images, the important image portion such as the diagnosis objective portion is present in the low spatial frequency region and does not have so many high spatial frequency components. Therefore, even though the spatial resolution is decreased and the high spatial frequency components are eliminated, deterioration of the image quality, particularly deterioration of the diagnostic efficiency and accuracy, does not arise so much as compared with the case where, for example, the density resolution is decreased.

The method of the present invention is advantageous particularly in the case where the image signals are stored for the purpose of, for example, using the image signals for reproducing the radiation image for comparison and viewing, particularly for diagnostic purposes after they are used for viewing, particularly for diagnostic purposes when the patient has left the hospital. This is because, in such a case, slight deterioration in the image quality caused by a decrease in the spatial resolution is allowable, and the marked compression of the image signals by the method of the present invention is strongly needed.

BRIEF DESCRIPTION OF THE DRAWINGS

FIG. 4 is an explanatory view showing previous value prediction errors or the like with respect to the image signals shown in FIG. 3, FIG. 5 is an explanatory view showing the storing condition of codes obtained by Huffman encoding of the previous value prediction errors or the like shown in FIG. 4, FIG. 6A is an explanatory view showing another embodiment of the signal number decreasing pre-processing, FIG. 6B is an explanatory view showing an example of the signal number restoring post-processing corresponding to the signal number decreasing pre-processing shown in FIG. 6A, FIGS. 7, 8A and 9A are explanatory views respectively showing embodiments of the phase shift sampling type signal number decreasing pre-processing.

DESCRIPTION OF THE PREFERRED EMBODIMENTS

The present invention will hereinbelow be described in further detail with reference to the accompanying drawings.

Figure 1A:
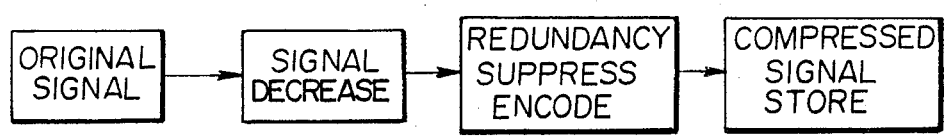
FIG. 1A is a compression process flow chart showing the method of compressing radiation image signals in accordance with the present invention.

Referring to FIG. 1A, the method of compressing radiation image signals in accordance with the present invention comprises the steps of conducting the pre-processing for decreasing the number of image signals on the original image signals representing a radiation image which are to be recorded, conducting the redundancy suppression encoding processing of the image signals decreased by the pre-processing, and storing the compressed signals thus encoded by the redundancy suppression encoding processing on a recording medium such as an optical disk.

Figure 1B:
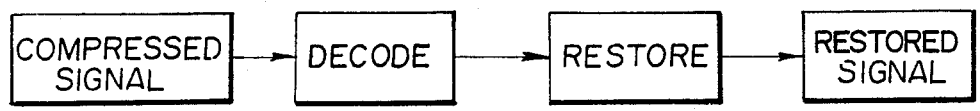
FIG. 1B is an extension process flow chart showing the method of compressing radiation image signals in accordance with the present invention.

As shown in the extension process flow chart of FIG. 1B, when the radiation image is reproduced based on the image signals thus compressed and stored, the compressed image signals are first read from the recording medium and decoded in accordance with the encoding table used in the aforesaid redundancy suppression encoding processing, and the signal number restoring post-processing is conducted based on the decoded image signals. Specifically, some image signals are calculated and restored based on the decoded image signals so that the number of the image signals becomes equal to the number of the image signals which were present prior to the signal number decreasing pre-processing. Thereafter, a visible radiation image is reproduced on a CRT or the like based on the image signals thus restored. Of course, the restored image signals include the image signals restored by the signal number restoring post-processing and the image signals restored by the aforesaid decoding processing.

The aforesaid signal number decreasing pre-processing is, in short, processing for decreasing the number of the image signals which are to be recorded, and may be carried out by various processing methods.

Figure 2A:
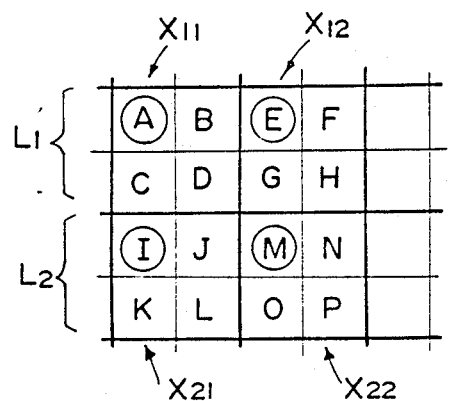
FIG. 2A is an explanatory view showing an embodiment of the signal number decreasing pre-processing.

FIG. 2A shows an embodiment of the signal number decreasing pre-processing. In FIG. 2A, each cell designates each picture element of a radiation image, and A, B, C, ... in the respective cells denote the image signals (original image signals) at the respective cells.

In this embodiment, as shown in FIG. 2A, the radiation image is divided into blocks each of which is composed of 2×2 picture elements. Image signals A, E, ..., I, M, ... of the picture elements at predetermined positions (the left top positions indicated by circles in FIG. 2A) of respective blocks (surrounded by bold lines) X11, X12, ..., X21, X22, ... are taken as representative image signals a11, a12, ..., a21, a22, ... (a11=A, a12=E, a21=I, a22=M, ...) of the respective blocks X11, X12, ..., X21, X22, .... Only the representative image signals are sampled as the image signals which are to be recorded. With this method, it is possible to decrease the number of the image signals to one fourth.

Thereafter, the redundancy suppression encoding processing is conducted as mentioned above on the thus decreased image signals a11, a12, ..., a21, a22, .... The redundancy suppression encoding processing is, in short, processing for encoding by suppressing the redundancy of information which the image signals carry, and may typically be prediction encoding, encoding by orthogonal transformation, or the like.

Figure 3:
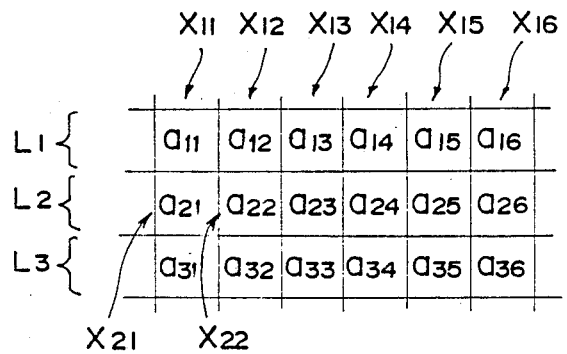
FIG. 3 is an explanatory view showing the image signals after the number thereof is decreased by the pre-processing shown in FIG. 2A.

The case where prediction encoding is conducted by use of previous value prediction and Huffman codes will be described hereinbelow. The representative image signals a11, a12, ..., a21, a22, ... obtained by the signal number decreasing pre-processing are arranged as shown in FIG. 3. The cells in FIG. 3 denote the respective blocks X11, X12, ..., X21, X22, ... in FIG. 2A.

First, the respective image signals are subjected to previous value prediction, and differences between the predicted values and the actual image signal values, i.e. prediction errors, are calculated. Specifically, the line of the blocks X11, X12, X13, ... carrying the representative image signals a11, a12, a13, ... is taken as a first block line L1. The line of the blocks carrying the representative image signals a21, a22, a23, ... is taken as a second block line L2, and the line of the blocks carrying the representative image signals a31, a32, a33, ... is taken as a third block line L3. The representative image signals a11, a21 and a31 are respectively the representative image signals of the head blocks on the block lines L1, L2 and L3. In this case, on the first block line L1, the signal value a11 is left as it is, a12 is predicted to be equal to the previous signal value a11, and a prediction error $\Delta a12 = a12 - a11$ between the actual signal value a12 and the predicted signal value a11 is calculated. The signal value a13 is predicted to be equal to the previous signal value a12, and a prediction error $\Delta a13 = a13 - a12$ between the actual signal value a13 and the predicted signal value a12 is calculated. In the same manner, $\Delta a14$, $\Delta a15$, ... are calculated. Also for the second block line L2 and the third block line L3, the head signal values a21 and a31 are left as they are, and $\Delta a22$, $\Delta a23$, $\Delta a24$, ... and $\Delta a32$, $\Delta a33$, $\Delta a34$, ... are calculated in the same manner for a22, a23, a24, ... and a32, a33, a34, ....

Then, a11, $\Delta a12$, $\Delta a13$, ..., a21, $\Delta a22$, $\Delta a23$, ... a31, $\Delta a32$, $\Delta a33$, ... obtained as shown in FIG. 4 in the same manner as mentioned above are encoded into Huffman codes.

In general, an image signal (a remark image signal) attains a signal value not so much different from an image signal present in the vicinity of the remark image signal. Thus, since it may be considered that there is not a large difference between the remark image signal and the image signal present in the vicinity thereof, the remark image signal is predicted to be equal to the image signal present in the vicinity thereof (the image signal present prior to the remark image signal in the aforesaid case), and the error of said prediction ($\Delta a21$, $\Delta a22$, or the like) is calculated. In this case, distribution of the prediction errors is concentrated in the vicinity of zero. In the prediction error encoding, it is possible to suppress the redundancy of the image signals and compress the total amount of the image signals by utilizing the characteristics that the prediction errors are concentrated near zero, and encoding the prediction errors and the image signals a11, a21, a31, ... at the head blocks on the respective block lines into Huffman codes so that a short code is allocated to a signal of a high frequency and a long code is allocated to a signal of a low frequency.

An example of encoding into the Huffman codes is shown below.

| Encoding objective signal value | Appearance probability | Huffman code |
| --- | --- | --- |
| 12 | 0.17915 | * 110010100 |
| 11 | 0.24725 | * 110010110 |
| 10 | 0.34762 | * 11000100 |
| 9 | 0.53324 | * 00001100 |
| 8 | 0.80575 | * 1100011 |
| 7 | 1.26047 | * 0000111 |
| 6 | 1.81047 | * 000001 |
| 5 | 2.59991 | * 11010 |
| 4 | 3.46648 | * 00110 |
| 3 | 5.00862 | * 1111 |
| 2 | 7.54548 | * 0010 |
| 1 | 11.69478 | * 101 |
| 0 | 27.29015 | * 01 |
| −1 | 11.69478 | * 100 |
| −2 | 7.54548 | * 0001 |
| −3 | 5.00862 | * 1110 |
| −4 | 3.46648 | * 00111 |
| −5 | 2.59991 | * 11011 |
| −6 | 1.81047 | * 000010 |
| −7 | 1.26047 | * 110000 |
| −8 | 0.80575 | * 1100100 |
| −9 | 0.53324 | * 00001101 |
| −10 | 0.34762 | * 11000101 |
| −11 | 0.24725 | * 110010111 |
| −12 | 0.17915 | * 110010101 |
| EXT | 1.71141 | * 110011 |

In the example shown above, an encoding objective signal value outside of the range from −12 to +12 is expressed in the form of an extension code (EXT) plus the signal value. For example, the encoding objective signal value of 13 is expressed as:

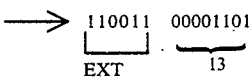

In the case where the prediction errors as the encoding objective signal values are created from the −255 level to the +255 level for example, though it would naturally be desirable for improving the compressibility that the Huffman codes be allocated to all of the encoding objective signal values, a signal value of a low frequency such as a signal value outside the range of −12 to +12 should preferably be expressed by the form of EXT plus the signal value. In this case, since the frequency of said signal value is naturally very low, the compressibility is not adversely affected, and the encoding table becomes compact.

The compressed signals encoded by the aforesaid method are recorded and stored on the recording medium such as an optical disk. An example of the signal storing is shown in FIG. 5. In FIG. 5, a11', Δa12', ... respectively denote the compressed signals obtained by encoding of a11, Δa12, ... into the Huffman codes, TOI denotes the identification code indicating the beginning of the image, and TOL designates the identification code indicating the beginning of each scanning line (i.e. the block line).

The compressed signals stored on the recording medium are read therefrom when necessary, and used for reproduction of a visible image.

Reproduction of the visible image will be briefly described hereinbelow. First, the compressed signals are read from the recording medium, and the decoding processing is conducted for decoding the compressed signals to the prediction error signals or the like (a11, Δa12, Δa13, ..., a21, Δa22, Δa23, ..., a31, Δa32, Δa33, ...), which were present prior to the compression encoding, on the basis of the Huffman encoding table used when the compressed signals were created, and calculating and restoring the representative image signals of the respective blocks from the prediction error signals or the like as shown below.

$$a11, a12 = a11 + \Delta a12, a13 = a12 + \Delta a13, \ldots$$

$$a21, a22 = a21 + \Delta a22, a23 = a22 + \Delta a23, \ldots$$

$$a31, a32 = a31 + \Delta a32, a33 = a32 + \Delta a33, \ldots$$

$$\cdot \quad \cdot \quad \cdot \quad \ldots \cdot$$
$$\cdot \quad \cdot \quad \cdot \quad \ldots$$
$$\cdot \quad \cdot \quad \cdot \quad \ldots$$

Then, the signal number restoring post-processing is conducted on the representative image signals of the blocks decoded and restored as mentioned above, and the number of the image signals is returned to the original number of the original image signals.

Figure 2B:
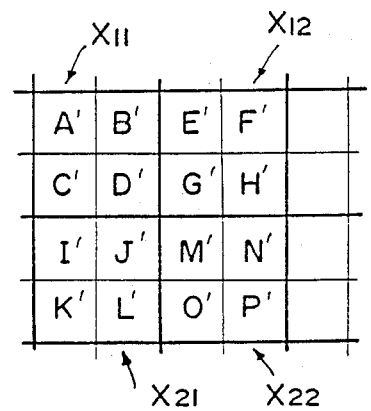
FIG. 2B is an explanatory view showing an example of the signal number restoring post-processing corresponding to the pre-processing shown in FIG. 2A.

FIG. 2B shows the restored image signals obtained by the signal number restoring post-processing. In FIG. 2B, restored image signals A', E', I' and M' at the left top picture elements in the respective blocks X11, X12, X21 and X22 have already been restored as the representative image signals as mentioned above, the restored image signals being expressed as A'=a11, E'=a12, I'=a21, and M'=a22. For restoring the image signals at the other picture elements, it is possible to employ various methods, for example, restoring by linear interpolation in the horizontal and vertical directions.

When the image signals B', C', D', G' and J' in FIG. 2B are decoded by the aforesaid method, they are expressed as shown below.

$$B' = \frac{A' + E'}{2} = \frac{a11 + a12}{2}$$

$$C' = \frac{A' + I'}{2} = \frac{a11 + a21}{2}$$

$$G' = \frac{E' + M'}{2} = \frac{a12 + a22}{2}$$

$$J' = \frac{I' + M'}{2} = \frac{a21 + a22}{2}$$

-continued
$$D' = \frac{C' + G'}{2} = \frac{B' + J'}{2} = \frac{A' + E' + I' + M'}{4}$$
$$= \frac{a11 + a12 + a21 + a22}{4}$$

A visible image may then be reproduced on a CRT or the like on the basis of the restored signals thus obtained (of course, the restored signals B', C', D', ... obtained by linear interpolation in this case do not exactly coincide with the original image signals B, C, D, ...).

The aforesaid signal number decreasing pre-processing may also be conducted by the method as shown in FIG. 6A. Specifically, the radiation image is divided into blocks each of which is composed of 2×2 picture elements as in the case of FIG. 2A, and average values of the image signals at the respective picture elements in the blocks X11, X12, ... X21, X22, ... are calculated as the representative image signals a11, a12, ..., a21, a22, ... of the respective blocks as shown below.

$$a11 = \frac{A + B + C + D}{4}, a12 = \frac{E + F + G + H}{4}, \ldots$$

$$a21 = \frac{I + J + K + L}{4}, a22 = \frac{M + N + O + P}{4}, \ldots$$

Only the representative image signals thus calculated are sampled. In the case where the pre-processing is conducted by this method, for example, the restored representative image signals a11, a12, ..., a21, a22, ... of the respective blocks may be processed as the image signals at specific positions of the respective blocks, for example, at the left top picture elements, in the signal number restoring post-processing in said extension process, and the image signals at the other picture elements may be restored by the horizontal and vertical linear interpolation as mentioned above on the basis of the representative image signals.

With this method, image signals A', E', I' and M' restored as shown in FIG. 6B by the signal number restoring post-processing are expressed as A'=a11, E'=a12, I'=a21, and M'=a22. Also, B', C', D', G' and J' attain the same forms as in the case of FIG. 2B.

In the signal number decreasing pre-processings shown in FIGS. 2A and 6A, blocks are set at the same phases for each of the block lines L1, L2, ..., and the representative image signals of the respective blocks are sampled. However, the block setting should preferably be effected by shifting the phases for each of the block lines. This is because, when sampling is effected by shifting the phases, coarseness does not become visually perceptible and apparent sharpness can be improved as compared with the case where sampling is effected without shifting the phases. Also, for example, in the case where a stationary grid for elimination of scattered radiation is used, a moire pattern readily arises on the restored image when the image signals are sampled at the same phases and the number thereof is decreased. On the other hand, when the image signals are sampled by shifting the phases, it is possible to suppress the occurrence of the moire pattern.

Examples of sampling by shifting the phases, i.e. typical examples of the phase shift sampling, will hereinbelow be described with reference to FIGS. 7 to 9C.

Figure 7:
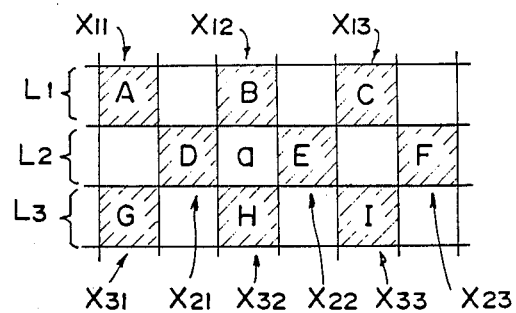

In the phase shift sampling as shown in FIG. 7, blocks X11, X12, X13, ..., X21, X22, X23, ..., X31, X32, X33, ... respectively composed of a single picture element indicated by a single cell are set in spaced relation to each other (in relation spaced by a single block in this case) on a plurality of the block lines L1, L2, L3, ... parallel to each other on the radiation image. In the block setting, the phases are shifted for each of the block lines. Only the representative image signals a11, a12, a13, ..., a21, a22, a23, ..., a31, a32, a33, ... calculated based on the image signals at the picture elements in the respective blocks thus set are sampled. In this case, for example, the image signals at the picture elements of the respective blocks may be directly used as the representative image signals a11, a12, a13, ..., a21, a22, a23, ..., a31, a32, a33, ... as shown below.

a11=A, a12=B, a13=C, ...

a21=D, a22=E, a23=F, ...

a31=G, a32=H, a33=I, ...

In the aforesaid case, restoring of image signals at picture elements where no signal is recorded in the course of signal number restoring post-processing in the extension process may be conducted by calculating the average value of four surrounding picture elements. For example, image signal a at the picture element surrounded by the blocks X12, X21, X22 and X32 in FIG. 7 may be calculated by $$a = \frac{B + D + E + H}{4}.$$

Figure 8A:
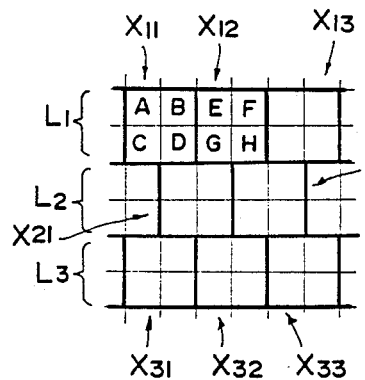
FIGS. 8B and 9B are explanatory views showing respectively showing the representative image signals of respective blocks in the case where block division is conducted as shown in FIGS. 8A and 9A, and FIGS. 8C and 9C are explanatory views respectively showing examples of the signal number restoring post-processings corresponding to the pre-processings shown in FIGS. 8A and 9A.
Figure 8B:
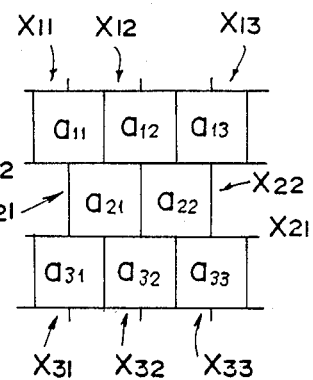

In another example of the phase shift sampling, the blocks are set to comprise 2×2 picture elements as shown in FIG. 8A. Blocks X11, X12, X13, ..., X21, X22, X23, ..., X31, X32, X33, ... are set continuously on the block lines L1, L2 and L3 so that the phases deviate from each other by one half of the block length among the block lines L1, L2 and L3. As shown in FIG. 8B, average values of the image signals at the four picture elements in the respective blocks are sampled as the representative image signals a11, a12, a13, ..., a21, a22, a23, ..., a31, a32, a33, .... Specifically, for example, a11 and a12 are calculated as shown below.

$$a11 = \frac{A + B + C + D}{4}, a12 = \frac{E + F + G + H}{4}$$

Figure 8C:
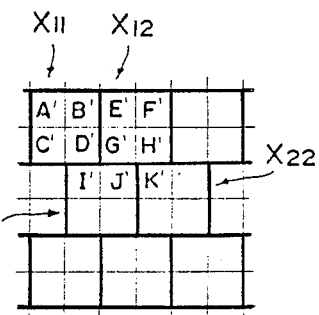

As shown in FIG. 8C, the signal number restoring post-processing in the extension process may be conducted by, for example, processing the image signals at specific positions of the respective blocks, e.g. at the left top picture elements of the respective blocks, as the representative image signals a11, a12, ..., a21, a22, ..., a31, a32, ... of the respective blocks, and calculating and restoring the image signals at the other picture elements by the horizontal and vertical linear interpolation from the representative image signals as shown below.

$$A' = a11, E' = a12, I' = a21, K' = a22,$$

$$B' = \frac{A' + E'}{2} = \frac{a11 + a12}{2}$$

$$D' = \frac{B' + I'}{2} = \frac{(a11 + a12)/2 + a21}{2}$$

$$J' = \frac{I' + K'}{2} = \frac{a21 + a22}{2}$$

$$G' = \frac{E' + J'}{2} = \frac{a12 + (a21 + a22)/2}{2}$$

Figure 9A:
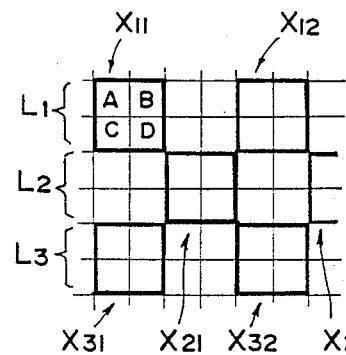
Figure 9B:
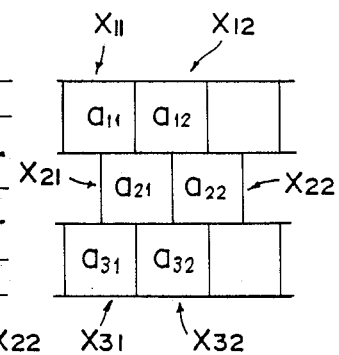

In a further example of the phase shift sampling, the blocks are set to comprise 2×2 picture elements as shown in FIG. 9A. Blocks X11, X12, ..., X21, X22, ..., X31, X32, ... are set at predetermined intervals equal to one block on the block lines L1, L2 and L3 so that the phases deviate from each other by one block length among the block lines L1, L2 and L3. As shown in FIG. 9B, average values of the image signals at the four picture elements in the respective blocks are sampled as the representative image signals a11, a12, ..., a21, a22, ..., a31, a32, .... Specifically, for example, a11 is calculated as shown below.

$$a11 = \frac{A + B + C + D}{4}$$

Figure 9C:
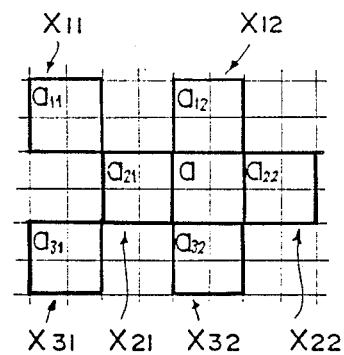

As shown in FIG. 9C, the signal number restoring post-processing in the extension process may be conducted by, for example, processing the image signals at specific positions of the respective blocks, e.g. at the left top picture elements of the respective blocks, as the representative image signals a11, a12, ..., a21, a22, ..., a31, a32, ... of the respective blocks, and an average value of the representative image signals of four blocks surrounding a 2×2 picture element section is allocated as the image signal at the left top picture element of said 2×2 picture element section. For example, as an image signal a at the left top picture element of the 2×2 picture element section surrounded by the blocks X12, X21, X22 and X32, the value calculated by $$a = \frac{a12 + a21 + a22 + a32}{4}$$

is allocated. Then, image signals at the other picture elements are calculated by horizontal and vertical linear interpolation from the representative image signals a11, a12, ... and the image signal a calculated on the basis of the representative image signals.

The signal number decreasing pre-processing may also be conducted in various other manners. For example, instead of setting the blocks comprising 2×2 picture elements as in the embodiments shown in FIGS. 2A, 6A, 8A and 9A, blocks comprising n×n picture elements wherein n denotes an integer of 3 or larger may be set. Or, instead of taking the average values of the image signals at the picture elements in the respective blocks as the representative image signals of the blocks as in FIGS. 8B and 9B, the image signal of the picture element at the specific position in the block may be taken as the representative image signal of the block as in the embodiment of FIG. 2A. Also, though the blocks are set in a checkered pattern and the image signals at the other image portions are discarded in the embodiments of FIGS. 7 and 9A, the block setting in the case of partially setting the blocks on an image and discarding the image signals at the other image portions may be conducted in various other manners.

Also, the aforesaid redundancy suppression encoding processing is not limited to the prediction encoding, it being possible to employ any other processing, for example, encoding by orthogonal transformation, for this purpose. Further, in the prediction encoding, the prediction method is not limited to the previous value prediction, it being possible to employ various other prediction methods, for example, two-dimensional prediction using the image signals at picture elements present in the vicinity of a picture element. Encoding of the prediction errors is not limited to encoding into the Huffman codes; any other encoding methods may be employed for this purpose.

It should be understood that the present invention is not limited to the aforesaid embodiments and may be modified in various manners within the scope of the invention.

I claim:

1. A method of compressing radiation image signals representing the picture elements of a radiation image, comprising the steps of:
pre-processing said radiation image signals based on the spatial frequency characteristics of said radiation image to produce representative radiation image signals less in number than said image signals representing said radiation image; and
subjecting only said representative image signals to a redundancy suppressing encoding process such that said representative image signals which have undergone said redundancy suppressing encoding process completely define said radiation image.

2. A method as defined in claim 1 wherein said pre-processing includes the steps of: dividing the picture elements constituting said radiation image into blocks, selecting the image signals of selected picture elements of respective blocks as said representative image signals, and then sampling as the image signals representing said picture elements constituting the radiation image only the representative image signals of the respective blocks.

3. A method as defined in claim 1 wherein said pre-processing includes the steps of: dividing the picture elements constituting said radiation image into blocks, calculating the average value of the image signals of the picture elements in each block as a representative image signal to thereby produce a representative image signal for each block, and then sampling as the image signals representing the picture elements constituting the radiation image only the representative image signals of the respective blocks.

4. A method as defined in claim 1 wherein said pre-processing includes the steps of: dividing the picture elements constituting said radiation image into blocks, each block consisting of at least one picture element, the blocks of picture elements along parallel block lines being offset from one another in the direction of the block lines, selecting at least one image signal of the selected picture elements within each block as a representative image signal of the respective block and sampling as the image signals representing the picture elements constituting the radiation image only the representative image signals of the respective blocks.

5. A method as defined in claim 1 wherein said redundancy suppressing encoding processing is prediction encoding processing.

6. A method as defined in claim 5 wherein said prediction encoding processing is carried out based on previous value prediction and encoding into Huffman codes.

* * * * *